United States Patent
Hoffman et al.

(10) Patent No.: US 9,839,936 B2
(45) Date of Patent: Dec. 12, 2017

(54) SMART TECHNOLOGIES AUTOMATED COATINGS

(71) Applicant: NORTHROP GRUMMAN SYSTEMS CORPORATION, Falls Church, VA (US)

(72) Inventors: Guy C. Hoffman, Tehachapi, CA (US); Jason Heron, Lancaster, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 2 days.

(21) Appl. No.: 14/818,099

(22) Filed: Aug. 4, 2015

(65) Prior Publication Data

US 2017/0036232 A1   Feb. 9, 2017

(51) Int. Cl.
| | | |
|---|---|---|
| *B05B 15/12* | (2006.01) | |
| *B05D 1/02* | (2006.01) | |
| *B05B 12/08* | (2006.01) | |
| *B05B 13/04* | (2006.01) | |
| *G01B 1/00* | (2006.01) | |

(52) U.S. Cl.
CPC .............. *B05D 1/02* (2013.01); *B05B 12/084* (2013.01); *B05B 13/0431* (2013.01); *G01B 1/00* (2013.01)

(58) Field of Classification Search
None
See application file for complete search history.

(56) References Cited

U.S. PATENT DOCUMENTS

| | | | |
|---|---|---|---|
| 4,614,300 A | 9/1986 | Falcoff | |
| 5,645,884 A | 7/1997 | Harlow, Jr. et al. | |
| 6,190,727 B1 | 2/2001 | Thaggard | |
| 6,256,597 B1 | 7/2001 | Wang et al. | |
| 6,508,112 B1 | 1/2003 | Verhoeven | |
| 6,663,918 B2 | 12/2003 | Manning et al. | |
| 6,973,199 B2 | 12/2005 | Farina | |
| 7,171,394 B2 | 1/2007 | Filev | |
| 7,394,555 B2 | 7/2008 | Cox et al. | |
| 7,672,478 B2 | 3/2010 | Farina | |
| 7,677,196 B2 | 3/2010 | Herre | |
| 7,792,611 B2 | 9/2010 | Scheer | |

(Continued)

OTHER PUBLICATIONS

Kelly, Craig, "Automotive Paint Technology into the 21st Century" ISS Institute Inc. Nov. 2009, Australia, 49 pgs.

(Continued)

*Primary Examiner* — Nathan T Leong
(74) *Attorney, Agent, or Firm* — John A. Miller; Miller IP Group, PLC

(57) ABSTRACT

A system and method for applying coatings to an object in a spray booth. The system and method include at least one robot that is operable to spray a coating on the object and at least one robot that includes a non-contact metrology sensor that is capable of measuring the object to determine the exact location of the object and the exact shape of the object. The sensor is also capable of measuring the thickness of the coating as it is sprayed on the object. The system and method further include a computing subsystem that is programmed to receive the measurements from the non-contact metrology sensor, where the measurements are used to determine spray paths and to adjust the spray paths for the at least one robot that is operable to spray the coating such that the object is sprayed with a coating that is within predetermined coating thickness tolerances.

20 Claims, 4 Drawing Sheets

(56) References Cited

U.S. PATENT DOCUMENTS

| | | |
|---|---|---|
| 8,788,081 B2 | 7/2014 | Nagatsuka et al. |
| 2006/0190110 A1 | 8/2006 | Holt et al. |

OTHER PUBLICATIONS

Seegmiller, Neal A. et al., "Precision Robotic Coating Application and Thickness Control Optimization for F-35 Final Finishes" SAE International, 2009, 6 pgs.

Li, Jia et al., "Integrated Process and Product Analysis: A Multiscale Approach to Paint Spray" AlChE Journal vol. 53, No. 11, Nov. 2007, pp. 2841-2857.

Bai, Yong, "Intelligent Painting Process Planner for Robotic Bridge Painting" Journal of Construction Engineering and Management, Apr. 2007, pp. 335-342.

Conner, David C. et al. "Paint Deposition Modeling for Trajectory Planning on Automotive Surfaces" IEEE Transactions on Automation Science and Engineering vol. 2, No. 4, Oct. 2005, pp. 381-392.

Filev, Dimitar, "Applied Intelligent Control—Control of Automotive Paint Process" IEEE, 2002, 6 pgs.

Penin, L.F. et al., "Robotized Spraying of Prefabricated Panels" IEEE Robotics & Automation Magazine, IEEE, Sep. 1998. pp. 18-29.

SMART TECHNOLOGIES AUTOMATED COATINGS

BACKGROUND

Field

This invention relates generally to a system and method for automated coatings application in a spray booth and, more particularly, to a system and method that provides automated adaptations for an object as-built and as-located in a spray booth to determine optimal spray paths for coating the object, where the system and method also measure thicknesses of the coatings that are being applied to the object in the spray booth using integrated sensing devices and a computing subsystem such that precise coating thicknesses may be achieved with limited human interaction.

Discussion

Coatings application specifications for manufactured objects such as airplanes, vehicles, parts, etc. typically require that the thickness of the coating applied be within precise tolerances to meet the required specifications. For example, stealth coatings on military aircraft must be within a narrow range to be acceptable for use. The task of achieving the required precision in coating thicknesses is particularly challenging when the surface being coated has a complex geometry, as is typical of military aircraft and military equipment.

Coatings are usually applied using industrial robots, sometimes referred to as coatings applications robotics or robotic spray guns, followed by a lengthy process of sanding and recoating to achieve the desired precise thicknesses over the various contours of the object. For example, one or more multi-axis industrial robots, such as six-axis robots, that are capable of moving along at least x- and y-rails, and possibly a z-axis lift, are typically used to apply coatings to objects. Many factors must be considered when employing such robots that affect coating thickness, such as material flow-rate, air pressure (both fan and atom), robot speed, number of coats, stepover distance, standoff distance, robot position and speed accuracy, aircraft/object position accuracy, coating delivery system accuracy, as well as booth temperature, humidity and airflow speed. This process requires a significant amount of time and manual labor to achieve the desired results.

Using known spray techniques, the object to be sprayed is located in a spray booth in a predetermined position with little room for error to ensure that the robots do not come into contact with the object being coated and to ensure that the coatings are applied to the desired thicknesses. Damaging the object being sprayed or the robot through contact between the object and the robot is extremely undesirable, particularly when, for example, an aircraft that cost over one billion dollars to manufacture is the object being coated. Additionally, inaccurate object positioning may lead to inaccurate coating thickness, requiring more sanding and/or recoating and thereby increasing the time and labor costs associated with coating the object. Thus, known systems require an object to be located in an exact position in the spray booth or require significant testing and reconfiguration to compensate for deviations in location, i.e., to compensate for the object "as-located".

An additional problem with trying to achieve precise coating thicknesses on an object is the issue of object variation. Using the example of a stealth bomber aircraft, there may be slight variations among the stealth bombers that are manufactured, e.g., a wing tip may sag differently between one stealth bomber and the next. Thus, simply using model programs for the expected shape of an object to be sprayed may lead to imprecise coating thicknesses. The variation that may occur between the shape of the manufactured object, i.e., the as-built object, and the shape of either that object as modeled or as measured from a previous complete spray of an object that is an object of the same manufacture may lead to inaccurate coating thicknesses due to these as-built variations. Additionally, the known coatings application system requires that the object position be within the spray booth in an almost exact location, as stated above. The known coatings application system must be tested and reconfigured to account for any deviation from the expected location of the object within the spray booth as well as any as-built variations to ensure a collision between the robots and the object does not occur. This testing and reconfiguring process requires manual labor and is time consuming.

Thus, there is a need in the art for a system and process for applying coatings to objects in a spray booth that automatically takes into consideration the object as-located and as-built such that a lengthy test process is eliminated. There is further a need in the art to use the as-located and as-built measurements in combination with coating thickness measurements taken during coating of the object such that spray paths of the robots may adapt during coatings application to ensure that the object is coated within predetermined thickness requirements with minimal sanding and/or respraying.

SUMMARY

A system and method for applying coatings to an object in a spray booth is disclosed. The system and method include at least one robot that is operable to spray a coating on the object and at least one robot that includes a non-contact metrology sensor that is capable of measuring the object to determine the exact location of the object and the exact shape of the object. The sensor is also capable of measuring the thickness of the coating as it is sprayed on the object. The system and method further include a computing subsystem that is programmed to receive the measurements from the non-contact metrology sensor, where the measurements are used to determine spray paths and to adjust the spray paths for the at least one robot that is operable to spray the coating such that the object is sprayed with a coating that is within predetermined coating thickness tolerances.

Additional features of the present invention will become apparent from the following description and appended claims, taken in conjunction with the accompanying drawings

DETAILED DESCRIPTION OF THE EMBODIMENTS

The following discussion of the embodiments of the invention directed to a system and method for applying coatings to an object is merely exemplary in nature, and is in no way intended to limit the invention or its applications or uses. For example, while the system and method may be used to apply coatings to an aircraft in a spray booth, the system and method described herein may be used to apply coatings to any object that is in the spray booth.

Reference throughout the specification using phrases such as "various embodiments," "some embodiments," "one embodiment," "some example embodiments," "one example embodiment," "an embodiment" or similar language means that a particular feature, structure or characteristic described in connection with any embodiment is included in at least one embodiment, meaning that the phrases set forth above, or similar language, as used throughout the specification, are not necessarily referring to the same embodiment. Particular features, structures or characteristics described in the specification may be combined in any suitable manner in one or more embodiments, thus, any failure to specifically describe a combination or sub-combination of particular features should not be understood as an indication that combinations or sub-combinations of features is/are not possible.

Figure 1:
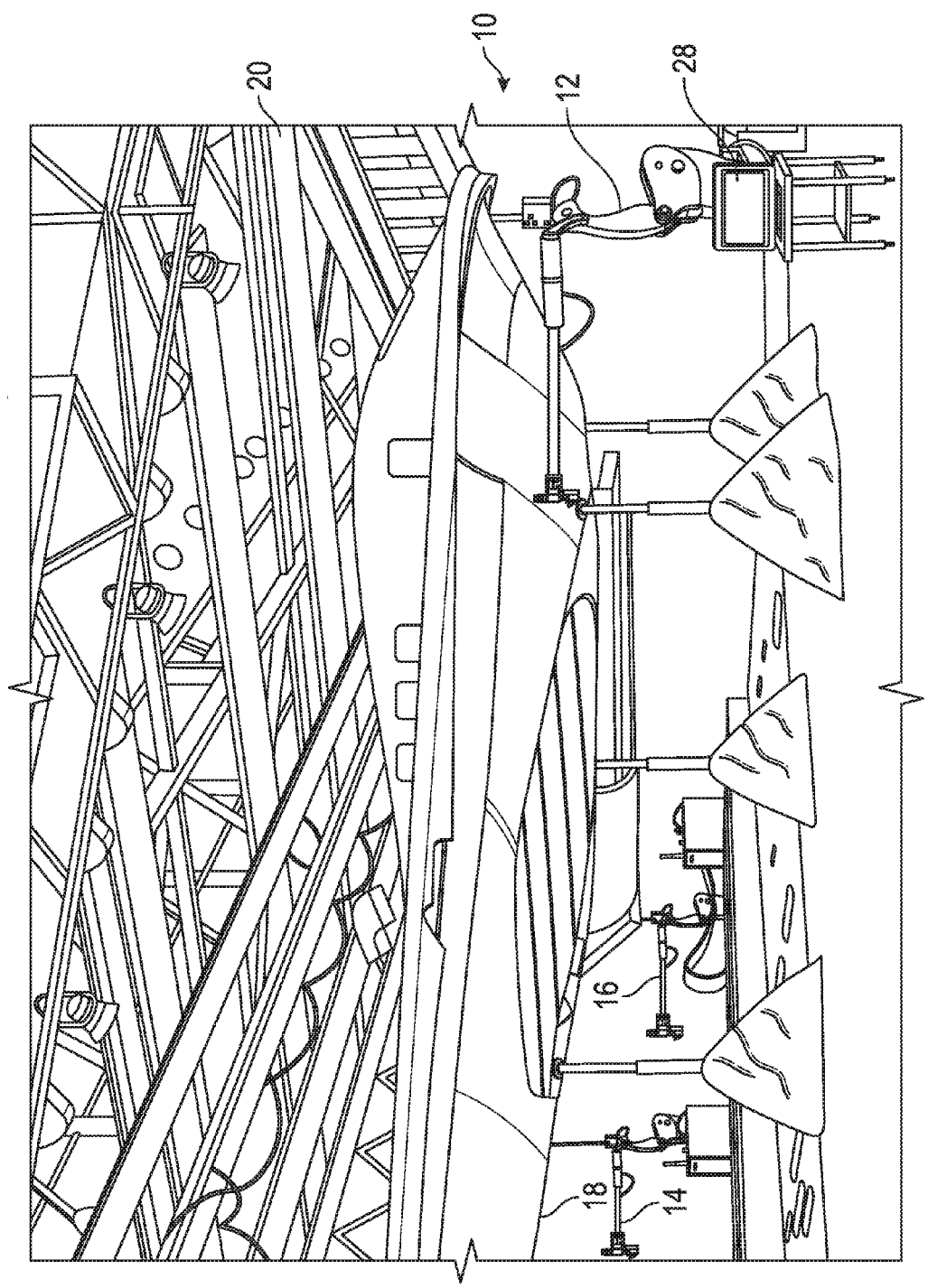
FIG. 1 is an isometric view of a spray booth system.

FIG. 1 is an illustration of an exemplary coating spray system 10 that is used for applying a coating to an object 18 in a spray booth 20. The object 18 is a military aircraft in this non-limiting example, but can be any object, such as an aircraft, aircraft parts, vehicles, vehicle parts, etc. The coating that is applied may be any suitable coating such as, for example, stealth coatings, stencils, paints, primers, topcoats, conductive coatings, liquid masking, etc. Three robots 12, 14 and 16 are part of the system 10, however, any number of robots may be used. The type of robots used may be any suitable multi-axis robot such as, for example, FANUC™ industrial robots. The robots 12, 14 and/or 16 may be mounted to rails (not shown for the sake of clarity) that allow the robots 12, 14 and/or 16 to be moved along an x-, y- and/or z-axis in a manner known to those skilled in the art. The robots 12, 14 and 16 are in communication with a computing subsystem 28 that includes a memory and is programmed with algorithms, described in more detail below, that are necessary to perform the method of spray coating the object 18 as described herein.

Figure 2:
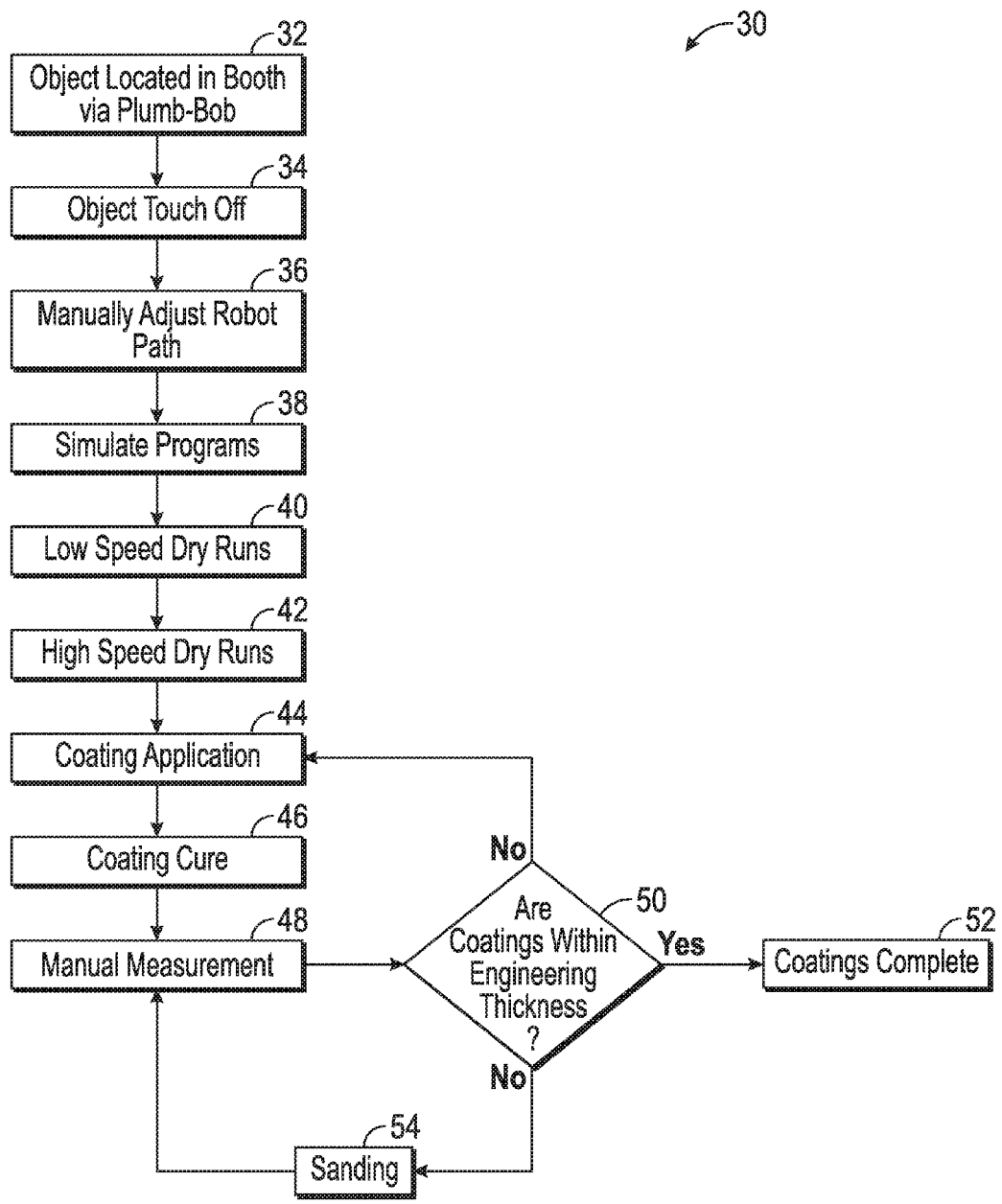
FIG. 2 is a flow chart diagram of a known method for applying a coating to an object according to a known process.

FIG. 2 is a flow chart diagram showing a known process 30 for spraying the object 18 in the spray booth 20 that does not use the specific computing subsystem 28 that is described in more detail below. At box 32, the object 18 is placed in the spray booth 20. As stated above, the object 18 must be located in a predetermined location within the spray booth 20 with little room for deviation. For example, the object 18 must be within two inches or less of the predetermined location in the spray booth 20 to ensure that the coating applied is within predetermined thickness tolerances and to ensure a collision between the object 18 and robots 12, 14 and/or 16 does not occur. In the case of a very large object that is to be placed in the predetermined location within the spray booth 20, such as the object 18, this task is very difficult and time consuming. While devices such as plumb-bobs, known to those skilled in the art, or similar devices are used to provide the desired alignment within a reasonable period of time, it is still expected that a certain amount of variation will occur when placing objects in the spray booth 20, referred to "as-located" variations. Thus, a series of steps are performed according to the process 30 to account for any variations between the object 18 as-located and the predetermined location that the object 18 is expected to be in. The steps also serve to mitigate build variations of the object 18, i.e., the as-built variation described above. As previously stated, not all objects end up being manufactured exactly alike, for example, an aircraft wing tip might sag in a slightly different way among that particular type of aircraft being manufactured. To mitigate the effects of as-located and as-built variations, a touch off of the object 18 is performed at box 34 to make sure the object 18 is in the predetermined location in the spray booth 20. Next, the spray paths of the robots 12, 14 and 16 are manually modified to compensate for any changes in path programming that is necessary due to the location of the object 18 in the booth or the particular build of the object 18, to ensure that the robots 12, 14 or 16 do not collide with the object 18 at box 36.

After the robot paths have been manually adjusted at the box 36, the programs for spraying the object 18 are simulated in a CAD environment at box 38, and low speed dry runs are performed at box 40 to ensure that the robots 12, 14 and 16 will not come into contact with the object 18. Once the low speed dry runs are successfully completed at the box 40, high speed dry runs are performed at box 42 to ensure the program will successfully execute at high speed. The steps of the boxes 34-42 are all performed to mitigate risk because the known process 30 is unable to automatically adjust for build and position deviations of the object 18, i.e., as-built and as-located variations.

Once the high speed dry runs have successfully completed at the box 42, coatings application is performed at box 44. Coatings application is performed according to preprogrammed robot spray paths that are verified or reprogrammed during the steps of the boxes 34-42 described above. Next, the coating is allowed to cure at box 46 and the thickness of the coating is measured manually at the box 48 using known measurement techniques, such as mechanical pin poke methods or a handheld electromagnetic device. At decision diamond 50, it is determined whether the coatings are within predetermined thickness tolerances. If yes, the coatings are complete at box 52. If no, as is often the case, the areas where the coatings are too thick are sanded down manually at box 54, and then manual measurements are retaken at the box 48, or another coating is applied at the box 44. The coating is allowed to cure at the box 46, and manual measurements are retaken at the box 48. The process of measuring and recoating/sanding will be repeated until the coatings are within the predetermined thickness tolerances. The process 30 is inefficient and often requires hours of manual sanding to achieve the desired coating thicknesses.

Figure 3:
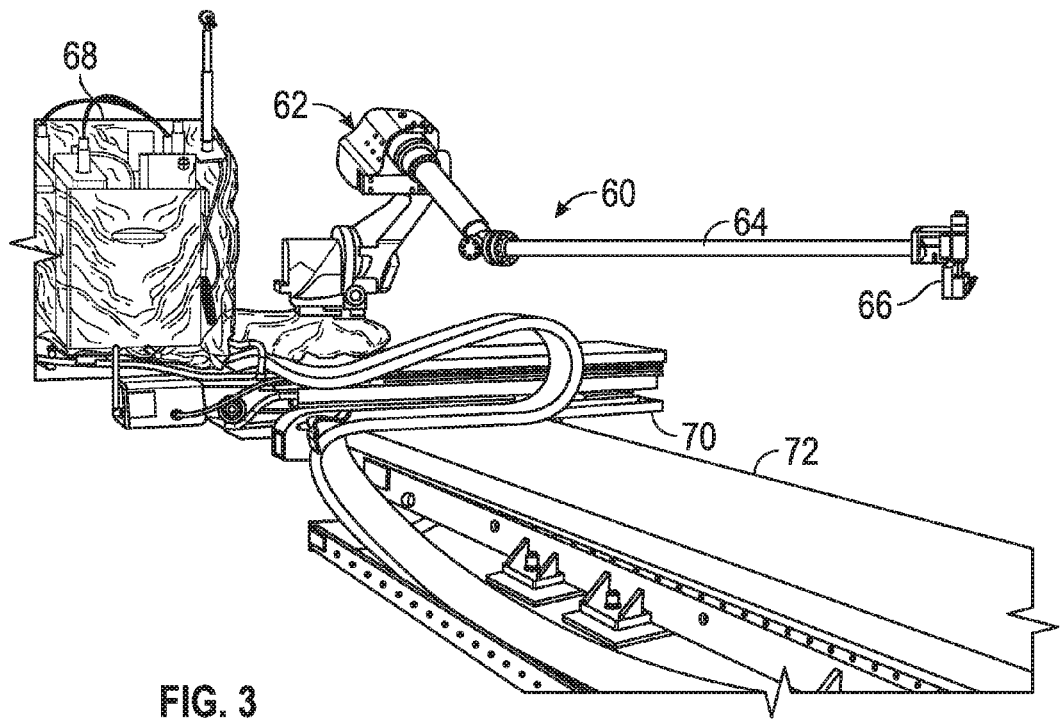
FIG. 3 is an isometric view of an exemplary robot with a spray tip that is used to apply coatings to an object.

FIG. 3 is an isometric view of an exemplary robot 60 that is used to apply coatings to an object in the spray booth 20. The robot 60 includes a robotic body 62, a robotic arm 64, and a spray tip 66 coupled to an end of the arm 64 opposite to the body 62. The robotic arm 64 is capable of moving, along rails 70 and 72 in this example, so that the spray tip 66 can apply a coating to an object as desired. A controls unit 68 that is in communication with the computing system 28 commands the specific movements of the robot 60, as is described in more detail below.

Figure 4:
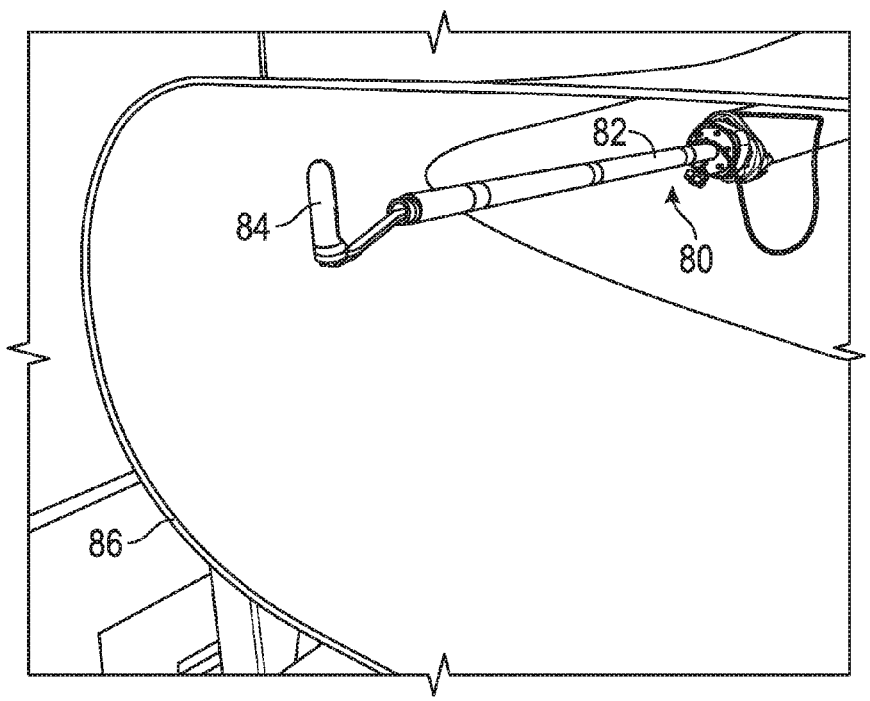
FIG. 4 is an isometric view of another exemplary robot with a non-contact metrology sensor that is used to measure coating thicknesses on an object.

FIG. 4 is an isometric view of another exemplary robot 80 that can be used to apply coatings in the spray booth 20. The robot 80 includes a robotic arm 82 having a non-contact metrology sensor 84 mounted to an end of the robotic arm 82 that is used to measure coating thicknesses on an object 86 after a coating has been applied. Any suitable non-contact metrology sensor may be used for the sensor 84, for example, the sensor 84 may be a structured light scanner. Although not shown for the sake of clarity, the robot 80 also includes a robotic body and a controls unit similar to those shown in FIG. 3.

The robots 60 and 80 may be used as the robots 12, 14 and/or 16 in the system 10 where any combination or number of the robots 60 and 80 may be employed to apply coatings and measure coating thicknesses as described in more detail below. The robot 60 may be modified by replacing the spray tip 66 with the sensor 84. For example, the robots 12, 14 and 16 may be equipped with the spray tip 66 during the spraying processes, where the spray tip 66 is swapped out for the sensor 84 during the measuring processes, as described in more detail below. Alternatively, the robots 12, 14 and 16 may be dedicated to spraying with the spray tip 66 or dedicated to measuring with the sensor 84, or the robots 12, 14 and 16 may include both the spray tip 66 and the sensor 84. The robots 12, 14 and 16 that include the spray tip 66 and/or the sensor 84 are in communication with the computing subsystem 28 using any suitable local network, as is understood by those skilled in the art. The non-contact metrology sensor 84 not only measures coating thicknesses, but is also used to scan the object 18 as-located in the spray booth 20 and to create an as-built model of the object 18 as described in more detail below. The sensor 84 performs the as-located measurements, as-built measurements and coating thickness measurements described herein using methods such as, for example, microwave reflection loss, radar detection, light scans, eddy current and magnetic induction, etc. To determine coating thickness, the entire object 18 may be coated and then the coating thickness determined, or the object 18 may be coated and measured in sections.

Figure 5:
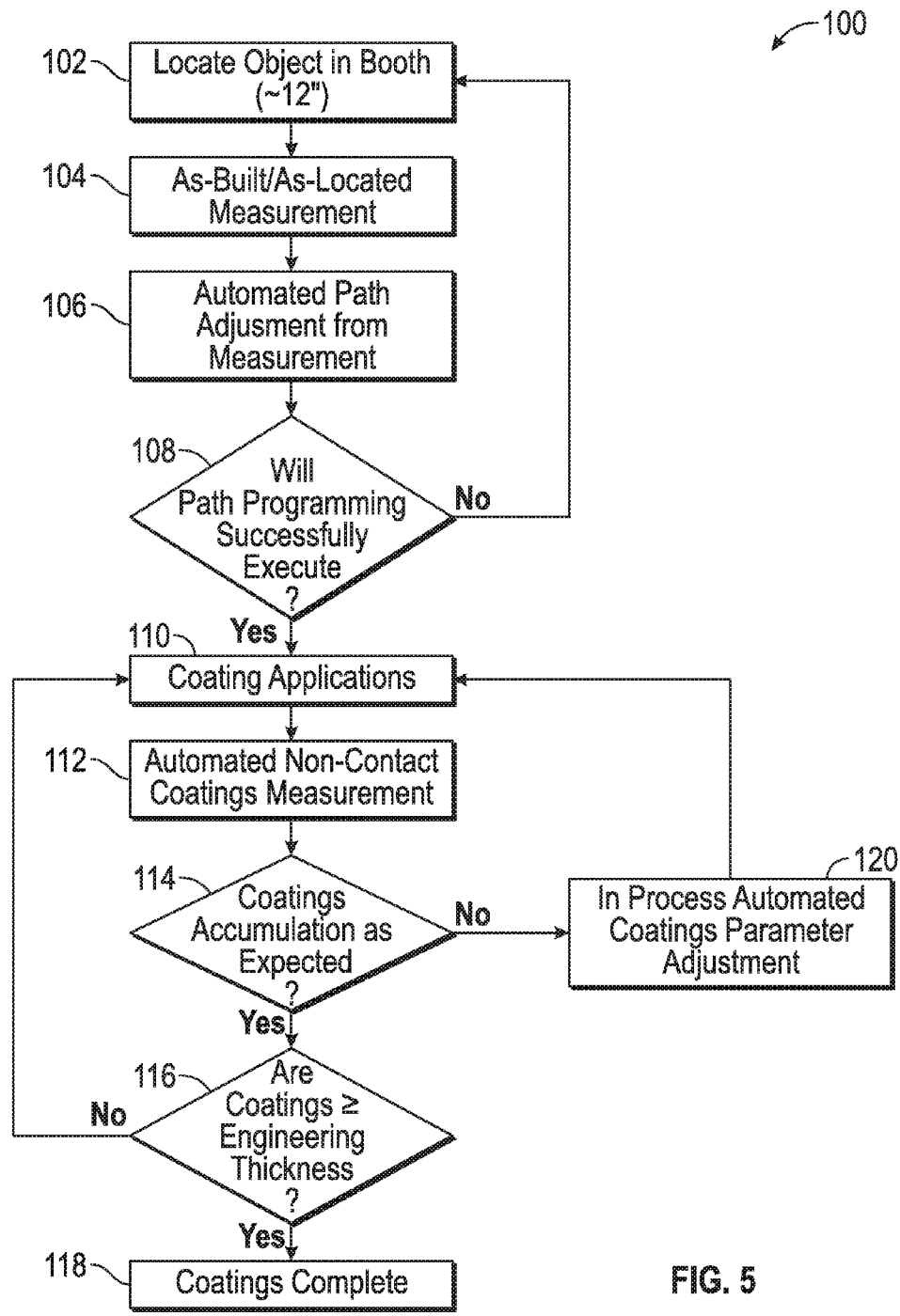
FIG. 5 is a flow chart diagram of a method for applying a coating to an object.

FIG. 5 is a flow diagram of an automated process 100 for spraying the object 18 in a spray booth 20 that utilizes the computing subsystem 28. Any object that requires a coating may use the process 100, including, by way of example, coating a military aircraft. The coating thickness deposited using the process 100 may achieve coating thicknesses within predetermined tolerances without requiring significant reworking of the coating thicknesses through sanding and/or respraying and is automated such that the process 100 is efficient, requires limited human interaction, and is cost effective compared to the process 30 described above.

At box 102 the object 18 is located in the spray booth 20 within, for example, approximately twelve inches of a predetermined object alignment location. As previously discussed, when locating a large object in the spray booth 20, plumb blobs, lasers, etc. may be used to help achieve the desired alignment of the object 18 within the spray booth 20. By allowing for up to, for example, twelve inches or more of variation for the location of the object 18, it is anticipated that less time will be required to locate the object 18 within the booth 20. As discussed above, with respect to the known method 30 of FIG. 2, the object 18 is required to be aligned within approximately two inches of the predetermined location for the object 18. Thus, a significant increase in the variation of the location of the object 18 is available according to the method 100.

Next, as-built/as-located measurements are performed at box 104 using the sensor 84. As stated above, the robots 12, 14 and 16 may be used for spraying using the spray tip 66 and measuring using the sensor 84. The robots 12, 14 and/or 16 may be dedicated to spraying or measuring, or may perform both duties by swapping out the spray tip 66 for the sensor 84 and vice versa. Alternatively, the robots 12, 14 and/or 16 may be equipped with both the spray tip 66 and the sensor 84. The measurements taken using the robots 12, 14 and/or 16 equipped with the sensor 84 are stored in a memory of the computing subsystem 28 and allow the computing subsystem 28 to understand where the object 18 is located relative to the predetermined location of the object 18, i.e., the modeled object location, as well as the exact shape of the object 18 relative to a model shape of the object 18, where the models are stored in a memory of the computing subsystem 28. As stated above, this is necessary because it is expected that each object that is to be coated in the spray booth 20 will vary in some way to the model build specifications and will also vary in the way they are positioned in the spray booth 20 relative to the model location.

Next, an automatic adjustment is performed at box 106 that adjusts the movement path of the robots 12, 14 or 16 as needed for the object 18 as-located and as-built. The computing subsystem 28 is programmed to automatically adjust the path programming at the box 106 by performing the two adjustments described above, specifically, one adjustment for the shape of the object 18 and one adjustment for the location of the object 18. For example, for a particular area of the object 18 that has a shape that is slightly different than expected, the movement path of the robots 12, 14 or 16 is deviated from the spray paths for modeled manufactured specifications of the object 18 to match the contour of the particular object 18 at the box 106. This may be accomplished in any suitable manner, for example, the computing subsystem 28 may determine the difference, or delta, between the object 18, i.e., as-built, and the stored model of the object 18, and the computing subsystem 28 may adjust the spray paths of the robots 12, 14 and/or 16 according to the object 18 as-built. To automatically adjust for object location, the computing subsystem 28 shifts the path programs for the movement paths of the robots 12, 14 and 16 in space as needed while maintaining the paths and the inter-path relationships at the box 106.

The computing subsystem 28 next determines if the path programming as adjusted at the box 106 will successfully execute at box 108. Using a concurrent simulation to do safety checks that do not require human intervention, the computing subsystem 28 ensures that the coating path programming of the robots 12, 14 and 16 will successfully adjust and execute given the "as-is" condition of the object 18, i.e., the condition of the object 18 as-built and as-located. This ensures that the robots 12, 14 and 16 do not touch the object 18. While there is typically 5-10 inches of space between the object 18 and the robots 12, 14 and 16, during certain spray maneuvers portions of one or more of the robots 12, 14 and 16 may cause portions of the robots 12, 14 and 16 to be within two inches of the surface of the object 18. This is particularly true when the object 18 has complex geometry.

The successful execution check performed at the box 108 ensures that no portion of the moving robots 12, 14 or 16 will touch or come into contact with the object 18, and is performed without human intervention while maintaining preprogrammed critical object-to-tool relationships, i.e., while maintaining stand-off and orientation parameters. As stated above, this is particularly important when the object to be coated is a high value asset.

Coatings application is performed at box 110 using the spray tip 66 on one or more of the robots 12, 14 and 16, where the number of coatings applied to the object 18 depends on parameters such as the final coating thickness desired. By way of example, one or two coatings may be applied to the object 18 at the box 110. Next, the process 100 performs automated non-contact coating measurements at box 112 using the non-contact metrology sensor 84 on one or more of the robots 12, 14 and 16.

Once the measurements are complete at the box 112 and stored in a memory of the computing subsystem 28, the computing subsystem 28 determines if the coating accumulations on the object 18, i.e., thicknesses at the measured locations, have achieved an expected accumulation amount at decision diamond 114. If no, the computing subsystem 28 will perform parameter adjustments at box 120 that are based on the measurements taken at the box 112 such that the amount of coating that is to be deposited on the object 18 in the particular measurement locations will automatically adjust by adjusting various parameters that affect coating deposition as desired. By way of example, the computing subsystem 28 may perform parameter adjustments such that the spray path speeds are dynamically adjusted to improve in-process coatings applications to achieve the desired coating thickness. For example, if certain measurement points are trending 0.02 inches lower than the other measurement points on the object 18, the computing subsystem 28 will automatically slow the spray paths for the measurements points that are trending lower by a percentage derived by the computing subsystem 28. In this way, the computing subsystem 28 performs automated adjustment of the robots 12, 14 and 16 along their respective spray paths to correct for coating accumulation deviations that result from inherent process variability.

Next, the process 100 returns to the box 110 for a next round of coating. During the next round of coating the robots 12, 14 and/or 16 spray the object 18 following the parameter adjustments made by the computing subsystem 28 at the box 120 such that less is deposited on the areas where the parameter adjustment determined that less of the coating is needed and more is deposited on the areas where the parameter adjustment determined that more is needed. In this way, the computing subsystem 28 may continuously adapt the spray path parameters as measurements are taken using an iterative process so that a coating thickness that is within predetermined tolerances may be achieved for the object 18 without requiring exact positioning of the object 18 in the spray booth 20, without requiring that the object 18 be built exactly as expected, and without requiring that the coatings be applied exactly as expected.

The coatings application at the box 110, the automated non-contact coatings measurements at the box 112, the determination as to whether the coatings applied accumulate on the object 18 as expected at the decision diamond 114, and the in-process automated coatings parameter adjustment at the box 120 repeat as many times as necessary until it is determined that the coatings have accumulated on the object 18 as expected at the decision diamond 114. Once the coatings have accumulated as expected at the decision diamond 114, the process 100 next determines if the coatings at the various measurement points on the object 18 are greater than or equal to a predetermined engineering thickness at decision diamond 116. If yes, the coatings application of the process 100 is complete at box 118. If no, the process returns to the box 110 and the robots 12, 14 and 16 continue to apply coatings to the object 18 without making parameter adjustments. In this way, the system 10 is automated with actionable intelligence in the computing subsystem 28 to capture and react to the dynamic conditions of spraying the object 18 as-located and as-built.

By measuring and adjusting spray patterns according to how the coatings are being deposited, improved spray coatings application may be achieved such that post-spraying touch labor is significantly reduced, thereby creating an efficient, automated process for spray coating objects using the spray booth system 10 and the process 100. For example, using the process 100 instead of the process 30, labor may be reduced by 300 hours per object to be sprayed for the setup portion of the compared processes, and labor may be further reduced by 2100 hours per object sprayed for the spray to completion portion of the compared processes.

Using the process 100, information such as measurements, adjustments, etc., are captured and recorded for each object sprayed such that the computing subsystem 28 may utilize the data collected over time to optimize path programming from object to object to reduce the inconsistencies that occur in coating thicknesses. This further reduces time and labor costs that are associated with correcting coating thicknesses. Using the process 100 described above, programming and risk mitigation efforts are done virtually without risk to product quality and the process 100 enables prototype programs to take advantage of automated coatings systems in a cost effective manner.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for applying coatings to an object in a spray booth, said system comprising:
   at least one robot that is operable to spray a coating on the object in the spray booth;
   at least one robot that includes a non-contact metrology sensor, wherein the non-contact metrology sensor is capable of measuring the object in the spray booth to determine an exact location of the object in the spray booth and an exact shape of the object in the spray booth, said non-contact metrology sensor further being capable of measuring a thickness of the coating as it is sprayed on the object in the spray booth; and
   a computing subsystem that is programmed to receive the measurements from the non-contact metrology sensor and provide the location of the object, the shape of the object and the thickness of the coating, said computing subsystem further being programmed to determine spray paths and adjust the spray paths for the at least one robot that is operable to spray the coating such that the object is sprayed with a coating that is within predetermined coating thickness tolerances.

2. The system according to claim 1 wherein the at least one robot that is operable to spray a coating and the at least one robot that includes the non-contact metrology sensor are the same robot.

3. The system according to claim 1 wherein the at least one robot that is operable to spray a coating and the at least one robot that includes the non-contact metrology sensor are different robots.

4. The system according to claim 1 wherein the computing subsystem is further programmed to use the measurements from the non-contact metrology sensor such that the location of the object in the spray booth and the exact shape of the object in the spray booth are used to determine the spray paths for the at least one robot that is operable to spray the coating.

5. The system according to claim 1 wherein the computing subsystem is further programmed to use coating thickness measurements from the non-contact metrology sensor to adjust the spray paths of the at least one robot that is operable to spray the coating such that a final coating thickness that is applied to the object is within the predetermined coating thickness tolerances.

6. The system according to claim 1 wherein the computing subsystem is further programmed to store data regarding coatings applications for objects that are coated in the spray booth and to compare the stored data such that future coatings applications are improved by optimizing the spray paths.

7. The system according to claim 1 wherein the object is located within approximately twelve inches of a predetermined object alignment location in the spray booth.

8. The system according to claim 1 wherein the computing subsystem is further programmed to apply a one or more coatings to the object before coating thickness is measured, or to apply a coating to a portion of the object and measure a coating thickness of the portion before a next coating is applied to a next portion of the object.

9. A system for applying coatings to an object in a spray booth, said system comprising:
   a plurality of robots that are operable to spray a coating on the object in the spray booth;
   a non-contact metrology sensor mounted to each of the plurality of robots, wherein each of the non-contact metrology sensors are used to measure the object in the spray booth to determine an exact location of the object in the spray booth and an exact shape of the object in the spray booth, said non-contact metrology sensors further being capable of measuring a thickness of the coating as it is deposited on the object in the spray booth; and
   a computing subsystem that is programmed to receive the measurements from the non-contact metrology sensors and provide the location of the object, the shape of the object and the thickness of the coating, said computing subsystem further being programmed to determine spray paths for each of the plurality of robots such that the object is sprayed with a coating that is within predetermined coating thickness tolerances, said spray paths being determined by the computing subsystem using the measurements from the non-contact metrology sensors such that the location of the object in the spray booth and the exact shape of the object in the spray booth are used to determine the spray paths for each of the plurality of robots, said computing subsystem further programmed to use the measurements of coating thickness as the coating is being applied to adjust the spray paths as needed to ensure the coating thickness that is applied to the object is within the predetermined coating thickness tolerances.

10. The system according to claim 9 wherein the computing subsystem is programmed to adjust the spray paths by adjusting one or more of robot speed, material flowrate, air pressure, stepover distance, standoff distance or robot position of at least one of the plurality of robots.

11. The system according to claim 9 wherein the non-contact metrology sensor is mounted to each of the plurality of robots by swapping out a spray tip for the sensor.

12. The system according to claim 9 wherein the computing subsystem is further programmed to store data regarding coatings applications for objects that are coated in the spray booth and to compare the stored data such that future coatings applications are improved by optimizing the spray paths.

13. The system according to claim 9 wherein the computing subsystem is further programmed to apply the coating to an entire object before a coating thickness is measured.

14. The system according to claim 9 wherein the computing subsystem is further programmed to apply the coating to a portion of the object and a coating thickness of the portion is measured before a next coating is applied to a next portion of the object.

15. A method that includes a computing subsystem that is programmed for applying coatings to an object in a spray booth system, said method comprising:
   positioning the object in the spray booth;
   measuring the object in the spray booth using a sensor robot that includes a non-contact metrology sensor;
   determining an exact location of the object in the spray booth;
   determining an exact shape of the object in the spray booth;
   determining spray paths for a spray robot that is operable to spray a coating on the object using the exact location and the exact shape of the object;
   spraying a coating on the object using the spray robot, said spray robot including a spray tip;
   measuring a thickness of the coating using the sensor of the sensor robot; and
   adjusting the spray paths using the measurements of the thickness of the coating such that a next coating that is applied to the object is within predetermined coating thickness tolerances.

16. The method according to claim 15 wherein adjusting the spray paths includes adjusting one or more of robot speed, material flowrate, air pressure, stepover distance, standoff distance or robot position of the spray robot.

17. The method according to claim 15 wherein the spray robot and the sensor robot are the same robot by including both a spray tip and a sensor, or by swapping the spray tip and the sensor as needed.

18. The method according to claim 15 further comprising storing data regarding coatings applications for objects that are coated in the spray booth and comparing the stored data such that future coatings applications are improved by optimizing the spray paths.

19. The method according to claim 15 wherein positioning the object in the spray booth includes locating the object within approximately twelve inches of a predetermined object alignment location.

20. The method according to claim 15 wherein spraying a coating includes applying a coating to an entire object before a coating thickness is measured.

* * * * *